Sept. 5, 1939.  F. G. KIRBY ET AL  2,172,283
CAMERA
Filed Dec. 28, 1936  6 Sheets-Sheet 1

INVENTORS
FRANK G. KIRBY
ARTHUR E. IRVING
BY
Orton and Griswold
ATTORNEYS

Sept. 5, 1939.  F. G. KIRBY ET AL  2,172,283
CAMERA
Filed Dec. 28, 1936  6 Sheets-Sheet 4
FIG. 4.
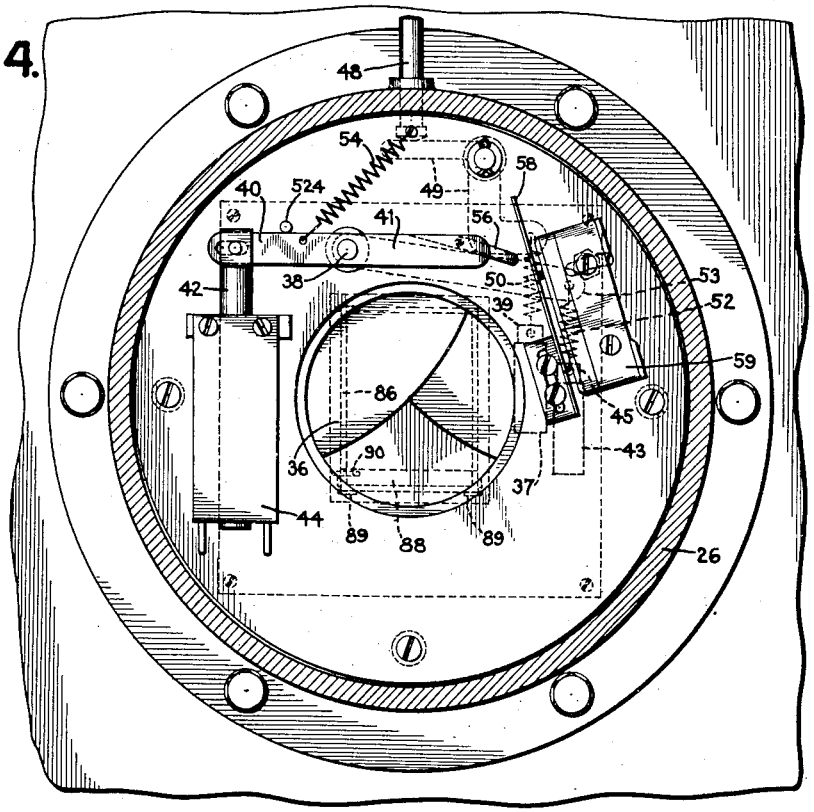
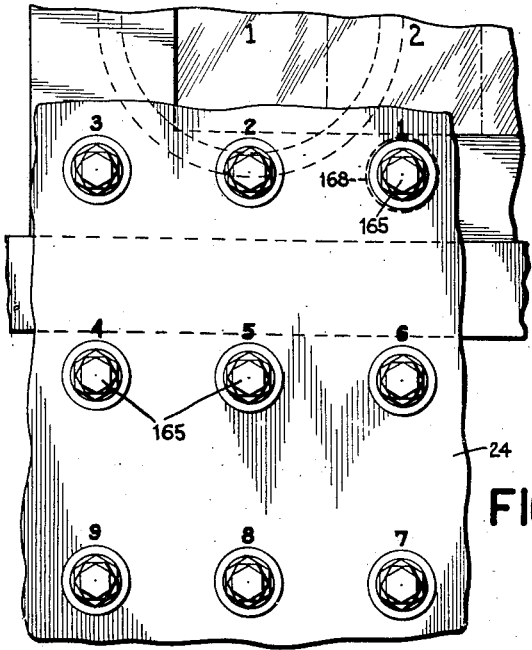
FIG. 5.
FIG. 6.
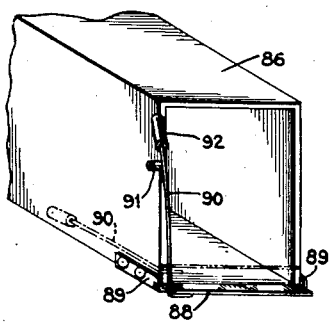
INVENTORS
FRANK G. KIRBY
ARTHUR E. IRVING
BY
*Orton and Griswold*
ATTORNEYS Sept. 5, 1939.   F. G. KIRBY ET AL   2,172,283
CAMERA
Filed Dec. 28, 1936    6 Sheets-Sheet 5
FIG. 7 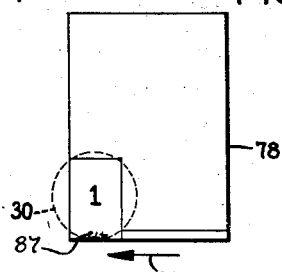  FIG. 7a 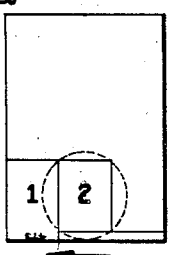  FIG. 7b 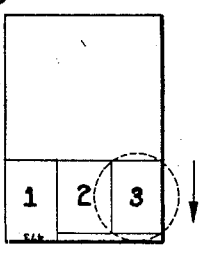
FIG. 7c 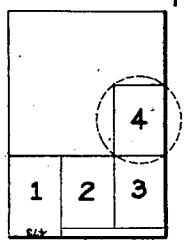  FIG. 7d 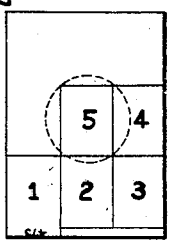  FIG. 7e 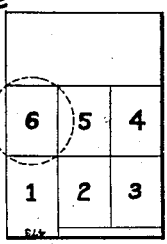
FIG. 7f 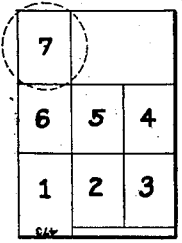  FIG. 7g 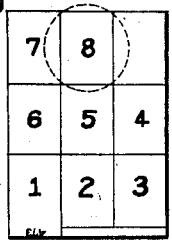  FIG. 7h

FIG. 9
INVENTORS
FRANK G. KIRBY
ARTHUR E. IRVING
BY
ATTORNEYS

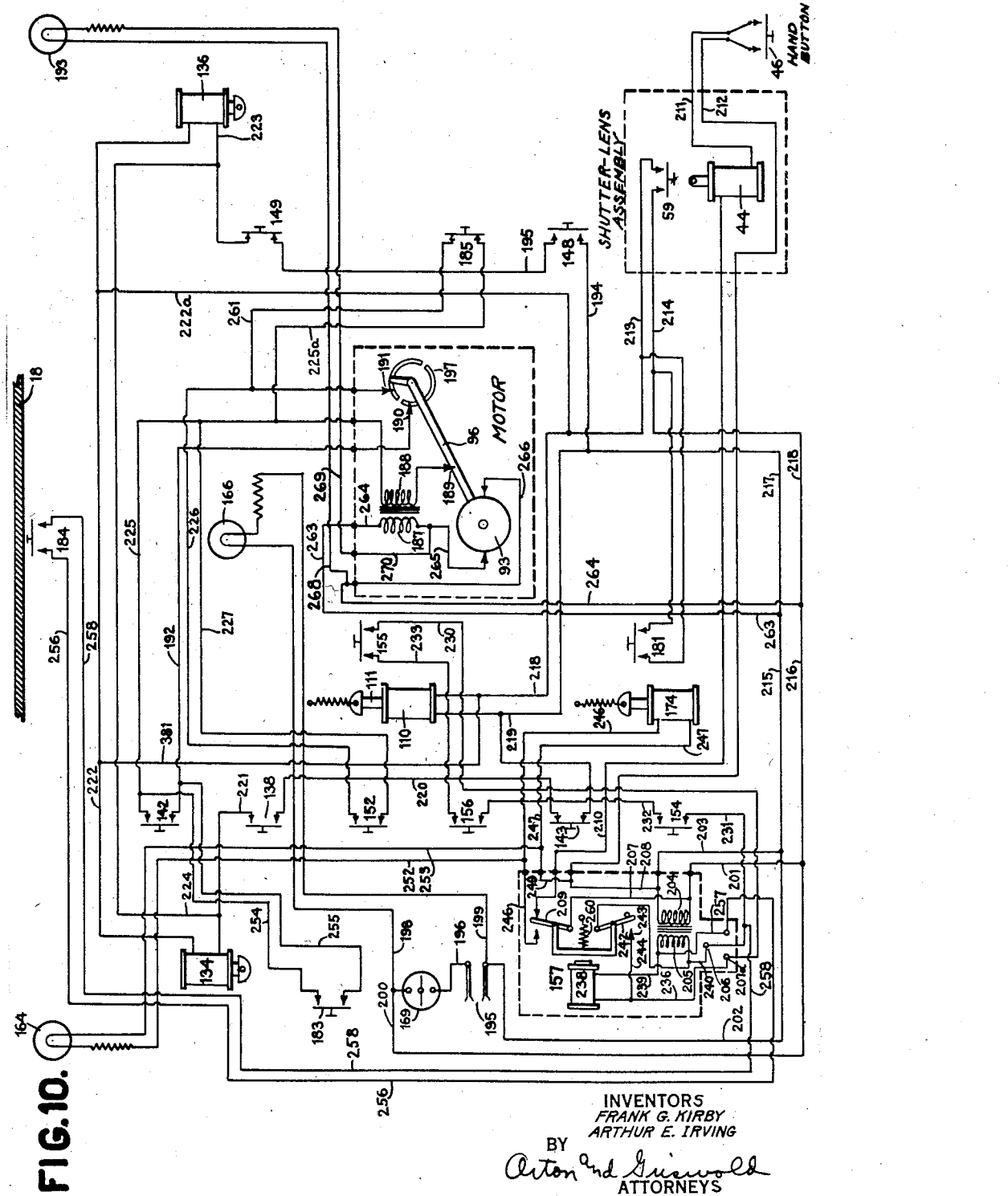

Patented Sept. 5, 1939

2,172,283

UNITED STATES PATENT OFFICE 2,172,283

CAMERA

Frank G. Kirby, Long Island City, and Arthur E. Irving, Brooklyn, N. Y.; said Irving assignor to said Kirby Application December 28, 1936, Serial No. 117,730

25 Claims. (Cl. 95—37)

This invention relates to cameras and more particularly to cameras adapted to take a plurality of photographs successively on a light responsive surface movable behind the lens.

One object of the present invention is a camera of the character described in which a plurality of pictures may be taken on a single plate.

Another object of the invention is a camera in which a plate is automatically moved between a plurality of positions behind the lens.

A further object of the invention is a camera of the character described in which the movement of the light sensitive surface is automatically controlled by the shutter actuation.

It is also an object of the invention to provide a camera having shutter actuating devices and devices to move a light sensitive medium in which the movement of one such device is dependent upon the completing of the movement of the other such device.

The invention also seeks an electrically operated shutter in a camera.

The invention also resides in the details of construction by which an operative camera of the character described is first produced and then operated.

These and other objects of the invention and the means for their attainment will be more apparent from the following detailed description, taken in connection with the accompanying drawings illustrating one embodiment, by which the invention may be realized, together with certain modifications thereof, and in which:

Figure 4 is a transverse, vertical, sectional view taken in the plane indicated by the line 4—4 of Figure 2, looking in the direction of the arrows and showing the shutter operating mechanism and its associated parts;

Figure 5 is a fragmentary view showing signalling devices which give, at a glance, the position of the light sensitive plate with respect to the lens.

Figure 6 is a fragmentary view showing the masking tunnel whereby light rays from the lens are confined so as to fall only on a predetermined area of a light sensitive surface;

Figure 8:
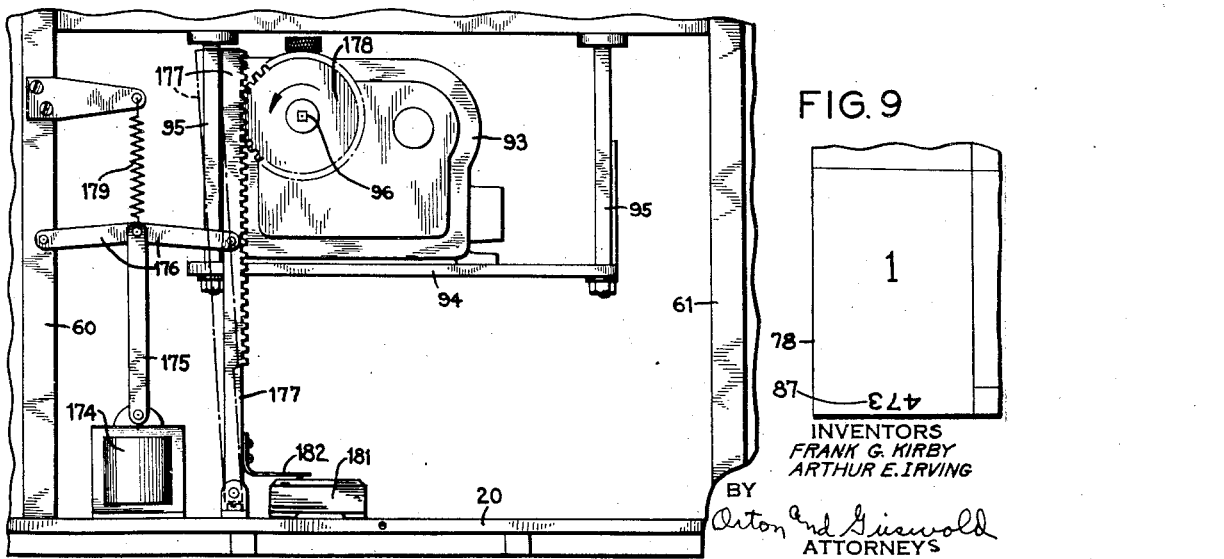

Figures 7 to 7h inclusive are diagrammatic views showing the sequence followed in taking a series of photographs on a plate;

Figure 8 is a fragmentary view showing a modified form of the invention in which the plate holder is automatically returned to initial position in the cycle of operations;

Figure 9 is a fragmentary view showing a portion of the light sensitive surface upon which the first exposure is made; and Figure 10 is a view showing a wiring diagram of this invention.

Figure 1:
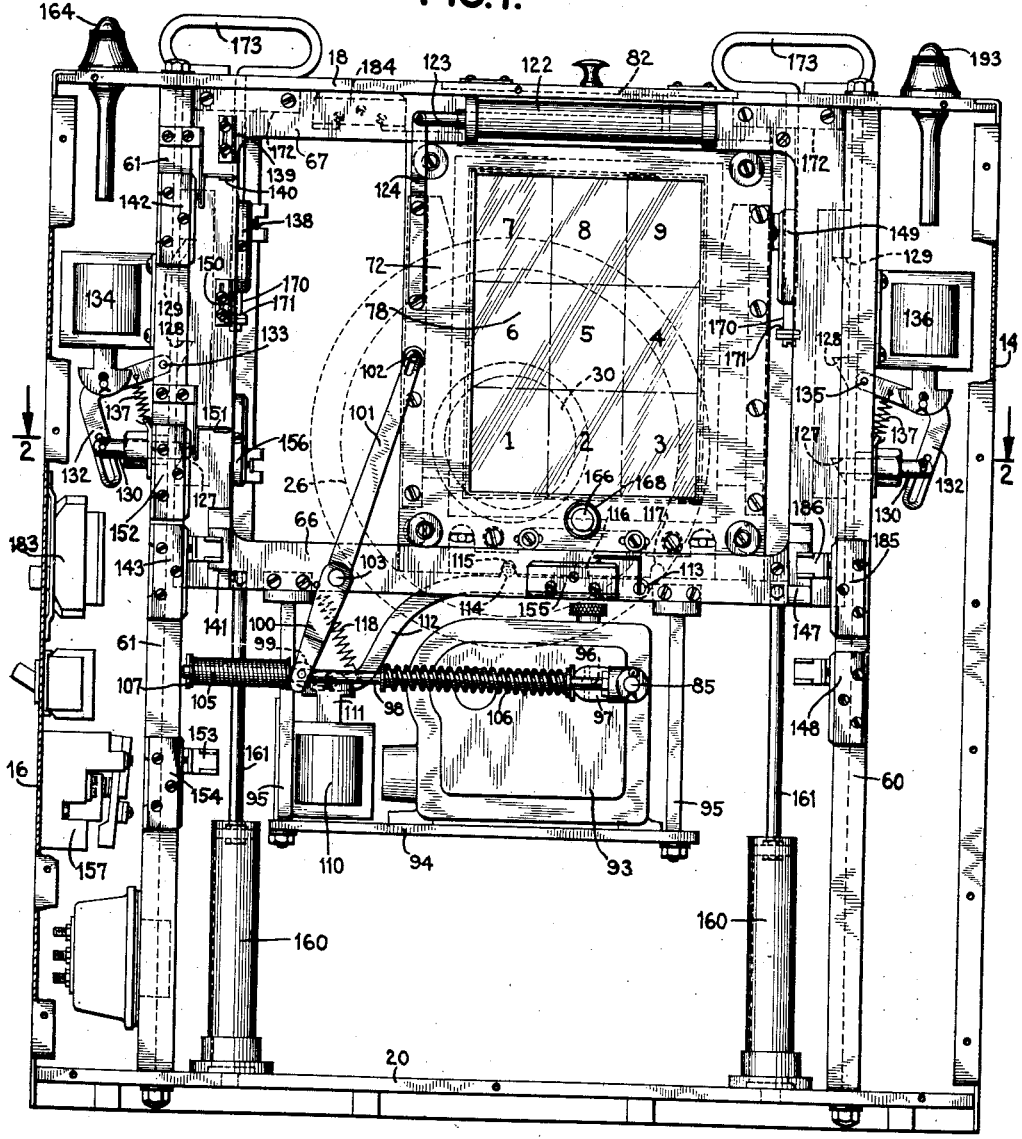
Figure 1 is a view of the camera of this invention with the rear cover removed to show details of construction, including the plate holding frame at loading position.
Figure 2:
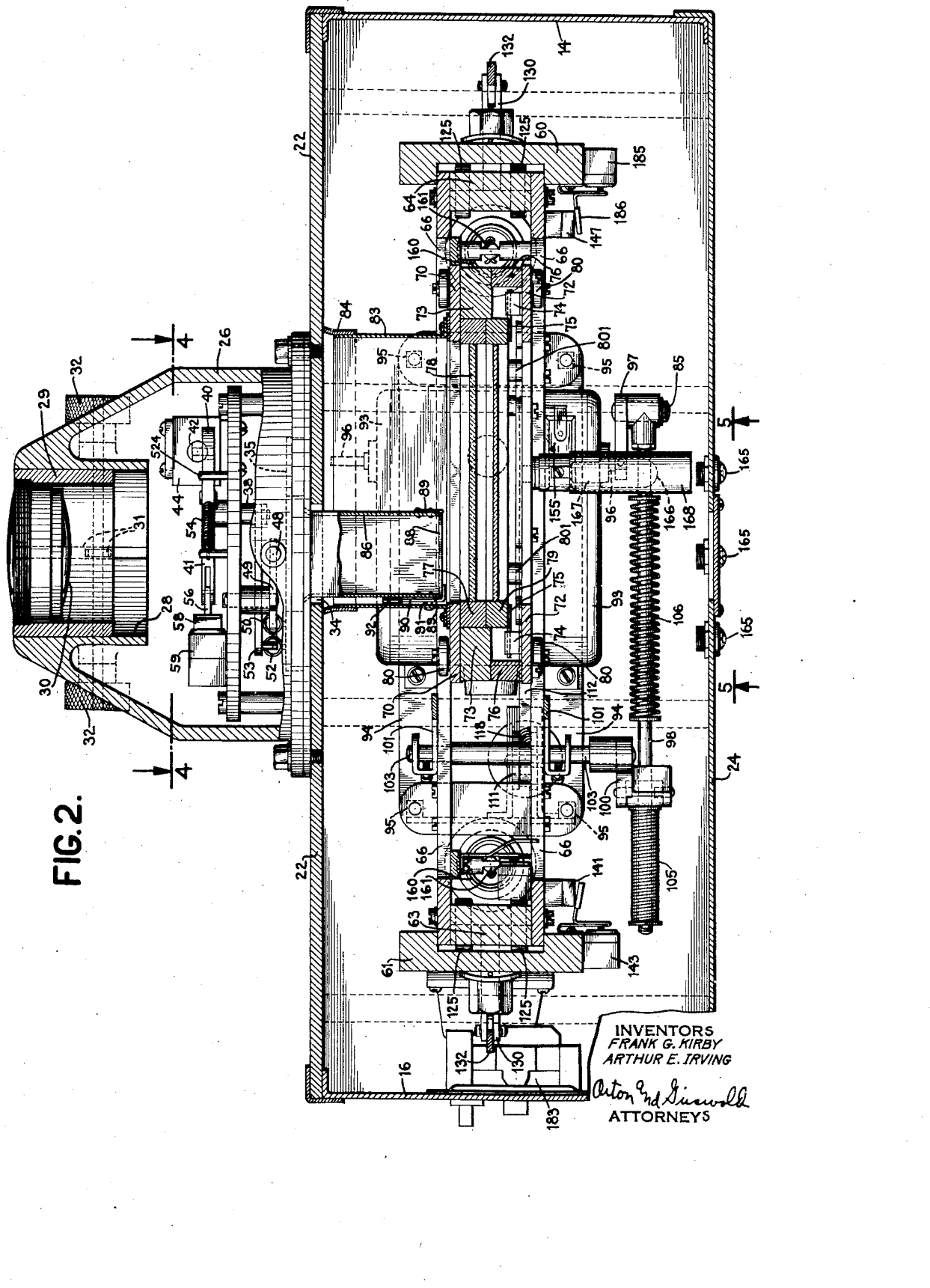
Figure 2 is a transverse sectional view taken in the plane indicated by the line 2—2 of Figure 1 and looking in the direction of the arrows.

Referring first to Figures 1 and 2, a housing or box is shown which is preferably of generally rectangular shape and comprises the side walls 14 and 16, the top and bottom walls 18 and 20, respectively, the front wall 22 and the rear wall 24. Preferably the case 14—24 is sealed against the admission of light.

On the front wall 22 is mounted in any convenient fashion a shutter and lens housing 26, the forward end of which is formed, internally, with a cylindrical guide surface 28 within which slides a tubular carrier 29 for the lens system 30. Movement of the lens for focusing is readily effected by, say, a rack and pinion mechanism 31 or the equivalent actuated by the focusing knobs 32.

Within the housing 26 (Figure 4) and controlling the passage of light from the lens to an opening 34 in the front wall 22 of the camera box is the shutter mechanism which may be of any convenient kind, located within a case 35. A common type of shutter mechanism may be adopted. One such mechanism carries on the outside of the shutter housing a cylinder 37 having a piston 39 movable therein to actuate the shutter 36 for time exposures, the upward movement thereof opening the shutter and the downward movement closing it again. A second cylinder 43 has a piston 45 therein which actuates the shutter for instantaneous exposures.

To effect a manual opening of the shutter for the purpose of focusing and without effecting energization of the several circuits, hereinafter to be described, performing the various operations contemplated herein, a hand actuated plunger 48 is illustrated adapted to actuate a bell crank 49 normally retained in operative position by its own weight. A spring 50 connects the bell crank 49 with the plunger 39 of the time exposure cylinder 37. The spring is a link to the shutter control 39 to allow said control to operate freely without moving the bell crank, when the instantaneous shutter control is operated by the solenoid 44 as next explained.

Preferably, according to this invention, the instantaneous shutter operator is actuated by electrical means. Actuation of the instantaneous shutter operating mechanism is effected through the turnable shaft 38, Figure 4. Fixed on this shaft is a lever 40—41, the arm 40 of which is connected by a lost motion connection with the armature 42 of solenoid 44. The solenoid 44 is energized by an electrical hand button, illustrated, at 46, in the wiring diagram of Figure 10. The solenoid armature 42 is normally maintained in an elevated position by rotation of the shaft 38, in a clockwise direction, by the spring 54 connected between the arm 40 and a fixed point on the housing. Rotation of the shaft 38 in a counter-clockwise direction rotates an arm 53 fixed thereon, also in a counter-clockwise direction.

The arm 53 is connected by a spring 52 to the piston 45 which effects the operation, i. e., opening and closing, of the instantaneous shutter. When the solenoid 44 is energized, the lever 40—41 is rocked in a counter-clockwise direction thereby effecting opening and closing of the shutter 36 during the first portion of its stroke, and, in the remaining portion of its stroke, effecting the momentary closing of a so-called "micro-switch" 59. Shutter operator 45 travels a certain distance, opening and closing the shutter, and meets a stop. The spring 52 stretches to allow arm 41 to continue its upward stroke. It must be kept in mind that the so-called "micro-switch" 59 operates, after the shutter operates, each time the hand button 46 is pressed. To permit this movement, a pivoted detent 56 on the arm 41 is brought into contact with a leaf spring 58 or other circuit closing element of the "micro-switch" 59 or its equivalent as the arm 41 moves upwardly and spring 52 stretches, to momentarily close the various circuits hereinafter to be discussed in connection with the operation of the apparatus. When the solenoid armature has completed its downward movement, the detent is clear of the switch actuator 58, so that the circuit closer 59 is again open. The hand button 46 may then be held closed or immediately released. If held closed, the solenoid 44 remains energized but the operations described are complete and remain uneffected. If the hand button 46 is immediately released, the solenoid is de-energized and permits the arm 41 to fall, the pivoted detent 56 riding past the actuator 58. As will be understood, when the armature returns, the switch 59 is not effected because the arm 41 is permitted to move downwardly without interference with or from the actuator 58 due to the pivoted detent 56 riding past the actuator 58 without hindrance. These actions reset the mechanism, so far described, for another operation.

Referring now to Figures 1 and 2, there is disposed within the camera box proper, and proximate the sides 14—16 thereof, a pair of channelled guides 60—61, each conveniently secured at the one end to the top 18 and at the other end to the bottom or base 20. A frame is slidable vertically in the guideways 60—61. This frame, referred to herein as the vertical frame, is shown as comprising two vertical end frame members 63—64 adapted to slide with minimum friction up and down the respective guideways 60 and 61 and connected on each side, both above and below, with transverse members 66—67, respectively, there being two spaced members 66, one on each side of the vertical frame members 63 and 64, at the bottom, and two spaced members 67, at the top. These members 66—67 serve as longitudinal guides or tracks for a laterally movable or horizontal frame adapted to receive and carry a plate holder and the sensitized plates.

The laterally movable or horizontal frame comprises generally a rectangular member 70 forwardly disposed with respect to the sensitized plate and a rearwardly disposed rectangular member 72. Carried within this assembly 70—72, on each side is a plate guide 73, immediately behind which and suitably spaced therefrom, are blocks 74 carrying springs 75 yieldingly holding a ground glass frame 79 which snaps into the position of the photographic plate when the plate holder 77 is removed, to be in proper position for focusing. The space between the guides 73, at the top, is open to permit insertion and removal of the plate holder 77 and plate 78. The plate holder 77 is held in position against the front frame 70 by means of the tension of the leaf springs 75 against the ground glass frame 79, which slips to the rear of the plate holder when the plate holder is inserted. An upright member 76 on each side completes the sides of the horizontal frame.

Carried on the front and rear frames 70—72 are rollers 80, which run on the tracks formed by the vertically movable frame guides 66 at the bottom, and bear against the guides 67 at the top. Conveniently, the rollers 80 are eccentrically mounted to permit an adjustment of the frame whereby the plate is properly positioned for exact vertical and longitudinal movement before the lens opening.

The plate holder 77 rests upon supports in the form of sleeves 801 extending between the bottom members 66 of the frame members of the horizontal frame.

To permit insertion and removal of the film holder 77, the top 18 of the box is formed with an opening 81 (Fig. 3) closed by a door 82. The opening 81 is so disposed as to enable the film or plate holder 77 to be inserted and removed at only the initial position of the horizontally movable frame.

While the interior of the box 12—24 is preferably dark because the box is sealed against the admission of light, an additional light excluding instrumentality is provided for the horizontal frame by mounting a generally rectangular light shield 83 (Fig. 2) in register with the opening in the front frame member 70 of the horizontal frame. This light shield 83 is conveniently provided with a flexible edge 84 yieldingly contacting with the rear surface of the front wall 22 so that it may slide thereover as the horizontal frame progresses from position to position and at the same time excludes all light from the film holder.

Reference should now be had to Figures 7 to 7h. It is contemplated in accordance with this invention that a plurality of pictures be photographically impressed upon the sensitized plates in a precise and definite manner. To this end, it may be considered that the plate is divided into nine subdivisions as illustrated in the lower right hand corner of Figure 7. The plate is therefore moved between nine different positions to bring these respective nine spaces seriatim before the lens. Thus in its initial position, the plate 78, with respect to the lens indicated by the broken lined circle 30, occupies the position of Figure 7 which is the same position illustrated in Figure 1. After the first exposure is made, it is contemplated that the plate 78 shall be moved to the left (as viewed from the rear) and as shown by the arrows 83 by the horizontal frame to bring the second area 2 before the lens, as shown by Figure 7a, for exposure 2. After exposure No. 2 has been made, it is contemplated that the horizontal frame shall move to its farthermost position to the left whereby exposure No. 3 is made, as shown by Figure 7b. The horizontal frame is then dropped vertically one space so as to bring space No. 4 before the lens, as illustrated in Figure 7c. Similar movements to those previously described with respect to Figures 7, 7a and 7b, but in the opposite direction indicated by the arrows 84 or toward the right as viewed, to cause the sequential making of the exposures 5 and 6, at which time the horizontal frame is at the right hand side, as viewed in Figures 1 and 7, when it is again dropped so that it assumes the position indicated in Figure 7f with space No. 7 before the lens. Seriatim movement of the horizontal frame in the direction of the arrow 85 in Figures 7g and 7h results in the sequential exposures of spaces 8 and 9, when the plate holder 77 and with it the horizontal frame, is in position to be automatically returned to the first position of Figures 1 and 7, when the plate holder is in register with the top door 82, permitting the plate holder to be removed from the horizontal frame.

In addition, it is deemed necessary to confine the light rays from the lens to the particular space on the photographic plate on which the picture is to be taken, and to this end there is mounted on the shutter carrier a masking tunnel 86. The masking tunnel 86 is illustrated as carried on the frame or casing 35 for the shutter and extends through the opening 34 in the front wall 22 of the camera box. It is rectangular in cross section, having greater height than width so as to concentrate the light on any one of the areas, Nos. 1 to 9, say, of the plate 78 of the desired shape and size. It is thus fixed in position while the light shield 83 moves relative thereto.

As a means for identification of the subject, it is desirable to place an identifying number 87 on the plate or film. Such a number may be photographically reproduced on the plate if a number is held in a fixed position over the head of the subject on the first exposure. As the image will be inverted with respect to the object, the number will, in this event, appear at the lower left hand corner of the photographic plate, that is space No. 1, as shown in Figure 7, and in order that the identifying number will appear on the first exposure only, this series of space No. 1 is longer, as shown, and is uncovered, in the first position, by a flap 88, Figure 6, which is mechanically opened when the frame 77 is in its first position and closed when the frame is in all other positions. The rear or inner end of the masking tunnel is open. At two corners thereof and preferably the lowermost corners, there are formed clips 89 between which the flap 88 is pivoted. On the flap 88, at one side, is a counterweighted arm 90 which normally occupies the dotted line position of Figure 6. When, however, the frame moves to the position indicated in Figures 1 and 2, a cam or detent 91 on the light shield 83 engages and moves upwardly the counterweighted arm 90 so as to throw the flap to the position shown in Figure 6 and unmask the bottom space on the plate so that an identifying number 87 may be photographically imposed upon the plate 78. After the first exposure, the movement of the horizontal frame carries the detent 91 away from the arm 90 which then falls aided by counterweight 92 and closes the flap 88 again.

*Traversing mechanism*

Movement of the horizontal frame from side to side across the lens within the vertically moving frame is effected by a motor 93 (Figures 1 and 3) carried on a platform 94 suspended as by arms 95 from the transverse bottom guide members 66 of the vertically moving frame. The motor shaft 96 (Figure 8) of this motor 93 is adapted to turn through 180° during each operation of the motor; always in a clockwise direction, as viewed in Figure 1. An arm 97 on the shaft 96 carries a stud 85 on which is pivotally mounted the end of a connecting rod 98, the opposite end of which is free. Intermediate its ends, a sleeve 99 is pivotally connected to one arm 100 of a lever 100—101, which is pivoted intermediate its ends on the lower frame member 66 of the horizontal frame. The other arm 101 of the lever is connected by a lost motion connection to a pin 102 on the frame members 70 and 72. Preferably as shown in the drawings, the pivot 103 of the lever 100—101 takes the form of a transverse shaft journalled in the respective guides 66, to the outer end of which the arm 100 is fixed, while identical lever arms 101 are fixed on the shaft 103, so that as the lower end of the arm 100 is rocked about the pivot 103, the upper ends of the arm 101 are moved proportionately in the opposite direction.

On each side of the pivoted sleeve 99 on the rod 98 are coil springs 105, 106, respectively, the movement of which toward the extremity of the rod is limited by a pinned washer 107, the inner ends of the springs being free to move on rod 98. As rod 98 is periodically reciprocated, springs 105, 106 are alternately compressed producing potential thrust first on one side of sleeve 99 and then on the other side thereof.

Also carried conveniently with the platform 94, is a solenoid 110 to the armature 111 of which is pivotally connected an arm or lever 112, the other extremity of which is pivotally connected to the guides 66 as at 113. On the lever arm 112 is a roller serving as a boss or pawl 114 adapted to be received in one of three recesses 115, 116 and 117, formed in the bottom frame member of the horizontal frame, these recesses 115, 116 and 117 being so positioned that when one of them, say the recess 115, engages the pawl 114 space 1 or 6 or 7 is immediately behind the lens and similarly when the recess 116 engages the pawl 114 the space 2 or 5 or 8 is behind the lens opening, and similarly when the recess 117 has been moved to the position to engage the pawl 114, a space 3 or 4 or 9 is before the lens.

Briefly, this portion of the device operates as follows: Each time the hand button 46 in wiring diagram Figure 10, is operated, the solenoid 44, Figure 4 is energized causing, during the first part of its stroke, the shutter to operate and during the completion of the stroke of the shutter-arm 41 results in the momentary closing of switch 59, Figure 4, and the energization of the solenoid 110, Figure 1, thereby momentarily moving the lever arm 112 downwardly and withdrawing the pawl 114 from the recess, say, 115. The arm 97 on motor shaft 96, being to the right as viewed in Figure 1, the rod 98 has passed through sleeve 99 compressing spring 105, and the potential thrust so produced will cause lever arm 100 to move to the right and move the horizontal frame toward the left, as soon as released from detent 114, the solenoid 110 immediately being deenergized due to momentary function of switch 59. In consequence, the spring 118 draws up the lever arm 112 and allows the detent 114 to enter the next recess, say, 116, thereby positioning the frame so that one of the plate portions or spaces 2 or 5 or 8 is before the lens, etc.

The horizontal frame moves against fluid pressure. This may be accomplished by, say, a cylinder 122 mounted on the upper guide 67, the piston rod 123 of which is connected to an arm 124 on the horizontal frame. In known manner, therefore, movement of the plunger 123 against fluid pressure in the cylinder 122 serves as a hydraulic check to slow down or cushion the motion of the horizontal frame under the action of either the spring 105 or 106 when it is released for expansion. There being, by design, enough potential thrust in spring 105 to carry the horizontal frame completely to the left, the pawl 114 need only to be removed by the energization of solenoid 110 after an exposure, to allow the horizontal frame to take, successively, as the case may be, positions 2 or 3, or positions 8 or 9.

After the horizontal movement of the horizontal frame (in taking a series of pictures in the lower row) is completed, the vertical frame 63, 66, 67 moves downwardly one step to bring the next or middle row of imaginary spaces 4, 5 and 6 on the plate 78 in register with the lens 30. It will be noted, particularly in Figure 3, that each side member of the vertical frame is recessed or otherwise formed to receive rollers 125 bearing on the channels 60 and 61 and with ratchet members 126 formed with downwardly facing notches 127, 128 and 129, one pair of notches, that is, one notch on each side, corresponding to a position of the vertical frame when a horizontal row of imaginary spaces on the photographic plate is in register with the lens opening. Cooperating with these notches is a reciprocating plunger-like pawl member 130 (Figure 1) one on each side, having a bevelled end 131 for ready insertion and removal from the respective correspondingly shaped notches. Each pawl 130 is actuated by a bell crank 132 pivoted, as at 133, say, on the guide 61. The bell-crank on the left is moved by a solenoid 134, while the pawl on the right is withdrawn from the notches on that side by a similar bell crank arm 132 pivoted at 135 and actuated by the solenoid 136. Both pawls 130 normally tend to enter ratchets by virtue of the spring 137 which rotates the bell crank about its pivot and tends to press the pawl against the side of the vertical frame.

Referring to Figure 1, on the left side of the vertical frame (as viewed in Figure 1) are two "micro-switches" 138 and 156 adapted to be closed by the horizontal frame when at its leftmost (as viewed). After the first and second pictures in the lowermost row have been taken, the horizontal frame has progressed toward the left side of the vertical frame, because the solenoid 110 has been energized each time the shutter operated. Upon completion of the second movement bringing space No. 3 behind the lens, a circuit closure such as a "micro-switch" 138 is closed to complete a circuit including the solenoids 134 and 136 and the "micro-switches" 59 and 143, switch 143, being closed by virtue of the position of the vertical frame, switch 156 is closed by the action of the horizontal frame but completes no circuit at this stage. Therefore, immediately after the third picture is taken, and after the stroke of the shutter arm 41 as closed the switch 59, solenoids 134 and 135 are energized and their respective armatures draw catches 130 from notches 127 and allow the vertical frame to drop. This circuit, being immediately deenergized by the immediate opening of the switch 59, as has previously been explained, the pawls 130 are again urged by their springs 137 against the vertical frame and slip into the notches 128 next above thus bringing the vertical frame to rest and aligning the plate with the center row of imaginary spaces.

During the dropping of the frame a detent 139, Figure 1, carried thereby operated switch closer 140, closing switch 142 resulting in closing the motor circuit and causing the motor 93 to run and turn the motor shaft 96 in a clockwise direction through 180° whereupon the circuit is automatically broken, bringing the motor to rest.

This movement of the motor shaft 96 brought arm 97 to the left of the shaft 96, causing the rod 98 to slide through sleeve 99 and resulting in the compression of the spring 106 producing potential thrust on the right side of the arm 100.

Also, in dropping, the vertical frame carried cam block 141 with it downwardly thereby opening switch 143 to prevent a circuit through solenoid 134 and 136 and switches 138 and 59 the next time 59 operates, for, as will be understood, switch 138 remains closed until the horizontal frame moves to the right.

Further, in dropping, cam block 147 is carried with the vertical frame into position to operate the switch closer and close switch 148 and place it in readiness to once more form a circuit through the solenoids 134 and 136 when the horizontal frame arrives at its extreme right position and closes switch 149 upon arrival.

The potential thrust now being upon the right hand side of arm 100 as viewed, and all the circuits open except that through the solenoid 110, the next exposure (at frame section 4) will result in the ultimate operation of the switch 59, Figure 4, and the momentary operation of solenoid 110 and arm 112 and the withdrawal of detent 114 allowing the horizontal frame to move one space to the right. As before, the residual potential thrust is sufficient to cause the horizontal frame to move one more step to the right after the succeeding exposure has been made to occupy the extreme right hand position, as viewed.

Figure 3:
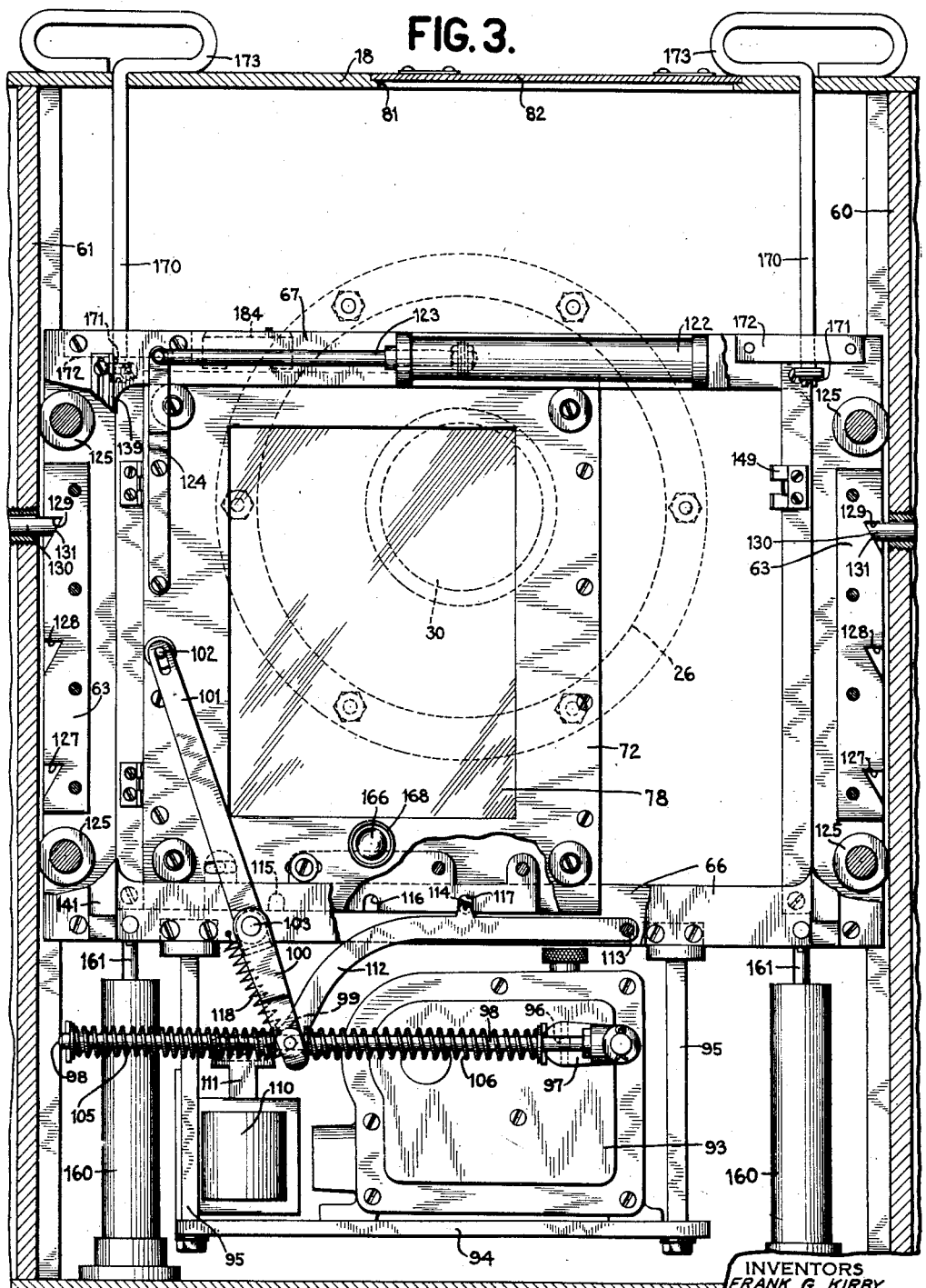
Figure 3 is a view on an enlarged scale showing the plate holding frame and its associated mechanism at its last position.

Arriving to the extreme right hand position, the horizontal frame closes the switch 149, which in conjunction with switch 148, previously described as closed through the action of the vertical frame in dropping the first time, the circuit through solenoids 134 and 136 will be made upon completion of the sixth exposure by the operation of switch 59 to allow the vertical frame to drop to the lowermost position, as shown in Figure 3, although the horizontal frame at this point in the cycle is to the right.

The drop of the vertical frame is retarded and controlled by hydraulic checking means shown as two fluid filled cylinders 160 into which pistons 161 carried with the vertical frame extend.

When the vertical frame drops the second time, a detent 150 operates a switch closer 151, closing switch 152 in the motor circuit to cause the motor to run through 180°. The resulting position of the motor is identical with the starting position thereof except that the plate 78 is aligned to allow the top row of imaginary spaces to take respective positions behind the lens, as the horizontal frame moves to the left. In dropping the second and last time, the vertical frame carried the cam block 147 away from switch closer, thereby opening switch 148 and the circuit through the solenoids 134 and 136 and switches 149 and 59. Also the cam block 141 was moved to the point where it operates the switch closer 153 and switch 154 closed.

Let it be noted that switch 155 is so employed that it will operate with each rotation of the motor shaft 96. This switch 155 with switch 154, 156 (which closes with the horizontal from in the ninth position) and switch 59 will form a circuit through the double-throw maintaining contactor 157 causing it to throw. This action can occur only after the ninth picture is made because only then are switches 155, 154, 156 and 59 simultaneously closed.

When the double contactor 157 is thrown, it performs several functions. First, the signal light 164 is lighted to indicate a fully exposed plate, second, the solenoid 174, Figure 8, is energized, it being in parallel with the signal lamp 164, and third, the circuit through the hand button 46 (Figure 10) is broken thereby preventing a double exposure at position 9 if the operator fails to notice the signal lamp. The purpose of solenoid 174 is hereinafter explained.

It is found desirable in some situations to indicate to the operator of the camera the space on the plate which is before the lens. Accordingly, on the rear wall 24 of the camera are nine safe-colored bull's-eyes indicated, generally, at 165 and disposed, in rows of three, corresponding to the nine spaces on the plate, or at least so arranged as to correspond to the number and location of the spaces on the plate. Cooperating with these lenses is a safe-colored pilot lamp 166 mounted on a suitable socket 167 on the horizontal frame. The pilot lamp 166 is surrounded by a tubular light funnel 168 whereby the light from the pilot lamp falls only on a single bull's-eye at each position. The relation of the lamp on the horizontal frame and the relation of the bull's-eyes are such that a bull's-eye is illuminated when the funnel is in register therewith at each position of rest assumed by the horizontal frame in its movement. This pilot lamp also indicates that current is flowing into the mechanism for it lights when the main switch 169, Figure 10, is thrown on.

In the embodiment of Figures 1–3, the vertical frame may be returned to initial position manually. As shown, connecting rods 170 extend through openings in the top wall 18 of the box and are secured, at their lower ends, in any convenient fashion to the vertical frame. Preferably such rods 170 are formed with a shoulder 171 at the lowermost end thereof and pass through openings in a plate member 172 at the top and between the guides 67 so that after the vertical frame has been drawn upwardly to its uppermost position and latched in that position by the pawls 130, release of the handles 173 permits the rods 170 to slide downwardly again to the position indicated in Figure 1. The vertical frame may, however, be returned to initial position automatically. One means of accomplishing this movement automatically is illustrated in Figure 8. In throwing (after the ninth exposure) the double relay, as previously described, solenoid 174 is energized, and the movement of its armature through link 175 causes toggle 176 to spread and allow rack 177 to engage pinion 178 on the remote end of the motor shaft 96 when viewed in Figure 1. Spring 179 breaks toggle, raises the armature and returns the rack to broken line position when solenoid 174 is deenergized, as will be hereinafter described.

In moving to the right, Figure 8, the rack 177 closes the switch 181 through the switch closer 182. Switch 181 short circuits the micro-switch 59, Figure 4, causing the energization of solenoid 110 and removal of the detent 114 from the escapement 115—117, an action necessary to permit the horizontal frame to reset.

Push switch 183 may now be manually pressed to start the motor, which in turning through 180°, causes pinion 178 to climb rack 177, carrying with it the vertical and horizontal frames. Also in turning, the motor shaft allows rod 98 to slip through pivot 99 tending to compress spring 106. Spring 106, however, does not compress (because the horizontal frame and the connecting arms are free to move by virtue of the detent 114 being held down, as previously described) but pushes arm 100 to the left and the horizontal frame to the right. Both frames arrive, at the completion of 180° rotation of the motor shaft, at the initial position. Upon arriving at the top, the vertical frame is held by catches 130 and switch 184 closes a circuit which causes double throw maintaining contactor 157 to return to normal position, breaking the signal light circuit, deenergizing the solenoid 174, Figure 8, and remaking a circuit through the hand button 46. In deenergizing solenoid 174, the toggle 176 is broken and causes the rack to disengage the pinion 178, Figure 8, which, in turn, opens switch 181 allowing deenergization of solenoid 110, Figure 1, and the return of detent 114 into notch 115. The plate holder and plate may now be removed.

The motor, however, must then run through another 180° to reset the spring 105, that is, bring it under compression. This is accomplished by cam block 147 returning to the position as seen in Figure 1 with the elevation of the vertical frame, and closing switch 185 through switch closer 186 to start the motor.

The motor 93 is of a type in which current supply is through the primary 187 of a transformer 187, 188. Only when the secondary of said transformer is shorted will the current supply become sufficient to run the motor. This shorting is accomplished at three contacts 189, 190, 191 shown in the wiring diagram of Figure 10. The middle contact 189 and one outside contact 190 short the transformer (inside of the motor case) causing the motor to run. On the motor shaft and inside its case is a controlling switch 197 which breaks the transformer secondary circuit when the shaft has turned 180°. Shorting the middle contact 189 and the other outside contact 191 will permit the motor again to turn through 180°. A signal lamp 193 in parallel with the motor field is illuminated when the motor turns to warn the operator against exposure of a plate at that time.

*Cycle of operation*

Reference will now be had to Figures 1 and 10 for an understanding of the cycle of operation of the camera of this invention. Let it be assumed that no photographic plate is in the camera, but that the camera is in focus, the operator having seen the object properly positioned on the ground glass screen 79. A plate 78 in its holder 77 is then inserted through the doorway 81 into the horizontal frame 78—75, and door 82 is closed. Main switch 169 is also closed. The photographer presses the hand button 46 to commence the operation of the camera in this cycle. The closing of the switch energizes solenoid 44 which actuates the shutter. After the shutter has operated, but in the same solenoid stroke, the detent 56 engages the leaf spring 58 to close the switch 59 which completes the various circuits.

A convenience outlet 195 is provided which, when connected by the usual attachment plug and cord (not shown) to a source of electric current, furnishes current for the entire circuit or circuits of Figure 10. The current supply is controlled, conveniently, by means of the toggle switch 169, being cut into the line through connection 196.

Circuit I

When switch 169 is closed, a pilot lamp 166 is illuminated, the circuit being through 198 and 199. This lamp, as well as being a pilot lamp to indicate that the circuit is operative travels behind the nine bull's-eyes 165 (Figure 5) to indicate the position of the light sensitive plate with respect to lens 30.

Circuit II

Also when switch 169 is closed, current is fed to the double throw maintaining contactor 157 through the circuit 200, 201, 202, 203 and 204. This contactor is now in readiness to operate but does not operate for, although the primary 204 of the transformer 204, 205 of the maintaining contactor 157 is now energized, the contactor 157 will not function until the secondary circuit of the transformer 204, 205 is completed by short circuiting the control contacts 206 and 207ª. This short circuiting occurs later in the cycle, as will be explained.

Circuit III

Leads 207 and 208 are tapped into the main current supply 201, 203 inside of the maintaining contactor 157, and, with the parts of the contactor 157 in the position shown, form a circuit through the hand button 46 and shutter solenoid 44 by means of circuit closer 209 and connections 210, 211 and 212, which circuit will be completed when the hand button 46 is operated, and the solenoid 44 energized. Energization of solenoid 44 causes the shutter to open and close and immediately thereafter (in the same stroke) causes the switch 59 to make and break, as has been explained, by the lever arm 56, Figure 4.

Circuit IV

When switch 59 is closed, the solenoid 110 is energized through connections 213, 214 and leads 215, 216, 217, 218 (the continuation of the supply leads 200, 202). Each operation of solenoid 110 causes the switch 155 to close, but no circuit is completed at this instant. That circuit will be explained later.

The operation of solenoid 110 causes, referring to Figure 1, armature 111, arm 112 and pawl 114 to drop and free the horizontal frame for movement. This frame moves one space only for switch 59 was only momentarily closed and solenoid 110 only momentarily energized.

To continue the cycle, the hand button 46 is again operated with the resulting making and breaking of circuit IV and the ultimate movement of the horizontal frame another space to the third position. As the horizontal frame comes into this third position, it mechanically closes switch 138. Switch 143 is closed, due to the position of the vertical frame.

Circuit V

The next operation of the hand button 46 causes solenoids 134 and 136 to operate because switches 138 and 143 now being closed, the solenoid 134 is connected in parallel to solenoid 110 through connections 219, 220, switch 143, switch 138, lead 221, 222 and 381. Solenoid 136 also operates, it being in parallel with solenoid 134 through connections 222, 223, 224 and 221.

These two solenoids 134, 136 being momentarily energized, withdraw the latches and allow the vertical frame to drop. In dropping, switch 143 is opened and circuit No. V is broken. The next operation of the hand button 46 will energize only solenoid 110 through circuit IV, as before explained.

Circuit VI

Also when vertical frame drops, referring to Figure 1, switch closer 140 is operated by detent 139 and switch 142 is closed. This closes a circuit through the motor transformer secondary 188 by connections 225, 189, 191, 190. The primary, now being satisfied, allows sufficient current to pass to operate the motor 93 which turns through 180° and stops, being controlled by the automatic switch 197. In dropping, the vertical frame also closes switch 148 through cam 147 acting thereon. No circuit is completed, however, until later in the cycle.

The operation of the hand button 46 two successive times, as before explained, will now allow the horizontal frame to assume the successive positions 5 and 6. Arriving at position 6, the horizontal frame mechanically closes switch 149. Switch 148 is closed due to the position of the vertical frame.

Circuit VII

The next operation of hand button 46 again causes solenoids 134 and 136 to operate for switches 143 and 148, now being closed, the solenoid 136 is connected in parallel to solenoid 110 through connections 194, 195, 223, 222 and 222a. The solenoids withdrawing the latches, the vertical frame again drops and in dropping, switch 143 is opened and circuit VII broken. The next operation of hand button 46 will energize only solenoid 110 through circuit IV.

Also, when the vertical frame drops, referring to Figure 1, switch closer 151 is operated by detent 150 and switch 152 is closed. This again causes a circuit through motor transformer secondary 188 by connections 226, 191, 189 and 227. The primary 187 again is satisfied and motor runs through 180°, bringing the automatic switch 192 to the first position and stopping the motor 93.

In dropping, the vertical frame also closes switch 154 through cam 141 acting upon closer 153. No circuit is completed, however, until later in the cycle.

Operation of the hand button 46 two times allows the horizontal frame to take positions 8 and 9 in sequence. Arriving at position 9, the horizontal frame mechanically closes switch 156. Switch 154 is closed due to the position of the vertical frame.

Circuit VIII

It has been mentioned that switch 155 closes each time solenoid 110 is energized. As the solenoid 110 is energized each time the hand button 46 is pressed, the switch 155 closes immediately after the ninth exposure is made. Switch 155 is connected in series with switch 156 and switch 154 and the double contactor 157 control contacts 206 and 207a through connections 230, 231, 232 and 233. As can be seen this circuit merely shorts the contacts 206 and 207a.

Circuit IX

However, inside of the contactor 157, a circuit is closed through the secondary 205 of its transformer through connections 236, coil 238, connections 239 and 240. This circuit energizes the electromagnet 238, thereby causing the contactor to operate.

Circuit X

In the operation of the contactor the arm 242 engages contact 243 and makes a maintaining circuit through connections 244, coil 238, connection 239, secondary 205, connection 240 and arm 242. This is necessary, for it is desired that the contactor 157 remain closed, and as switch 155 was only momentarily closed, circuit VIII was only momentarily completed.

Circuit XI

In operating, contactor 157 broke circuit III because of the changed position of the arm 209. In changing, arm 209 also closed a new circuit, energizing solenoid 174 through connections 246, 247, solenoid 174, connections 249, 208, 203, 202, current supply, connections 200, 201, 207 and arm 209. The signal lamp 164 is also lighted, it being connected in parallel with solenoid 174 through connections 252 and 253.

Solenoid 174 being energized, the rack 177, Fig. 8, engages pinion 178 and closes switch 181 by means of the switch closer 182.

Circuit XII

Switch 181, when closed, performs the same duty as the "micro-switch" 59 in the shutter mechanism and closes circuit IV allowing solenoid 110 to draw detent 114, Figure 1, from the horizontal frame escapement 115, 116, 117. There being no potential thrust on either side of arm 100, the horizontal frame does not move as yet but all is in readiness for the resetting operation which occurs with the energization of the motor.

Circuit XIII

Manual push button or circuit closer 183 is for the purpose of effecting energization of the motor and, upon being pressed momentarily, forms a motor energizing circuit through connections 254, 225, 189, 190, 192 and 255. The motor turns through 180°, raising the vertical frame and pushing the horizontal frame to initial position. The vertical frame carries switch 184 which, when the vertical frame reaches initial position is closed by pressure against the case-top 18.

Circuit XIV

Switch 184 in closing, shorts the transformer 204, 205, in the contactor 157 through connections 256, 257, 240, 231 and 258. The circuit including coil 238 being short circuited, the arms 209 and 242 return to their initial position through the action of spring 250 again closing the hand button circuit III, deenergizing solenoid 174 and extinguishing signal lamp 164. In deenergizing, solenoid 174 allowed rack 177, Figure 8, to disengage from pinion 178 and the vertical frame, being no longer elevated, settles onto catches 130. Also in returning to initial position, the rack 177 opened switch 181, which allowed detent 114 to reengage the horizontal frame escapement to prevent the horizontal frame from moving as the motor 93 continues to run.

Circuit XV

Normally the motor 93 stops at 180° but, it being necessary to build potential thrust on the spring 105 to completely reset the mechanism, the switch 185 is closed by cam block 147 and closer 186 when the vertical frame is elevated. Switch 185 maintains the motor circuit through connections 261, 226, 191, 96, 189, 225 and 225a. The motor then stops in original position after turning through 180° and the mechanism is ready for another complete cycle.

Circuit XVI

The motor is constantly connected to the main current supply through connections 263, primary of transformer 187—188, lead 265, the armature 93, lead 266 and lead 264 to the current supply 215—216. Whenever the motor operates, a signal lamp 193 burns to warn the operator against making any exposure, it being desirable that the thrust be completely built up before horizontal motion of the frame is started.

Circuit XVII

The signal lamp 193 is connected in parallel with the motor armature through connections 266, 268, 269, 270 and 265 and receives current only when it is supplied to the motor armature.

It will thus be seen that a camera has been provided which is capable of the sequential taking of a plurality of pictures compactly on a single plate or film wherein it is only necessary, after the camera has been loaded and the electrical circuit as a whole, therein, energized, for the operator to press a button each time an exposure is to be made. The movement of the relatively movable frames as the several exposures are made effects the energization of various circuits whereby subsequent movements of the frame are effected and the return of the frames to initial position for insertion and removal of a film holder being automatically effected by the parts at the different positions of rest.

Various modifications will occur to those skilled in the art in the composition, configuration and disposition of the component elements going to make up the invention as a whole as well as in the selection and utilization of various of the component elements to meet conditions, and no limitation is intended by the phraseology of the foregoing specification or illustrations in the accompanying drawings except as indicated in the appended claims.

What is claimed is:

1. In a camera, the combination with a lens behind which a film is movable to bring predetermined areas of the film at the focus of the lens, of a masking tunnel disposed between the lens and the film, a flap movable from an unmasking position to a position closing at least part of the tunnel opening, a counterweight carried with said flap and fixed cam means to raise the counterweight at one position of the film.

2. In a camera, the combination with a lens behind which a film is movable to bring predetermined areas of the film at the focus of the lens, of a masking tunnel, rectangular in cross-section, disposed between the lens and a film, a flap carried by the tunnel and movable from an unmasking position to a position closing at least part of the tunnel opening, an arm carried with said flap, a counterweight on the arm and fixed cam means to raise the counterweight at one position of the film.

3. In a camera, the combination with a lens behind which a film is movable to bring predetermined areas of the film at the focus of the lens, of a masking tunnel, rectangular in cross-section disposed between the lens and the film, clips on opposite sides of one edge of the tunnel, a flap carried by the clips and movable from an unmasking position to a position closing at least part of the tunnel opening, an arm carried with said flap, a counterweight on the arm and fixed cam means to raise the counterweight.

4. In a camera, the combination with a camera box and a lens, of means to selectively position predetermined areas of a film behind the lens, one wall of the box being formed with a plurality of apertures corresponding to a number and location of said different positions of the film, bull's-eyes closing the apertures, respectively, a light carried with the positioning means and movable thereby to predetermined positions to selectively register with an aperture, a shield surrounding the light to confine said light on a desired aperture.

5. In a camera, the combination with a camera box and a lens, of means to selectively position predetermined areas of a film behind the lens, one wall of said box being formed with a plurality of apertures corresponding to the number and location of said different positions of the film, bull's-eyes closing the apertures, respectively, and a light carried with the positioning means and movable thereby to predetermined positions to selectively register with an aperture.

6. In a camera, the combination with a camera box and a lens, of means to selectively position predetermined areas of a film behind the lens, one wall of said box being formed with a plurality of apertures corresponding to the number and location of said different positions of the film, a light carried with the positioning means and movable thereby to predetermined positions to selectively register with an aperture and a shield surrounding the light to confine said light on a desired aperture.

7. In a camera, the combination with a camera box and a lens, of means to selectively position predetermined areas of a film behind the lens, one wall of said box being formed with a plurality of apertures corresponding to the number and location of said different positions of the film and a light carried with the positioning means and movable thereby to predetermined positions to selectively register with an aperture.

8. In a camera, the combination with a camera box and a lens, of means to selectively position predetermined areas of a film behind the lens, one wall of the box being formed with a plurality of apertures corresponding to the number and location of said different positions of the film, bull's-eyes closing the apertures, respectively, a lamp carried with the positioning means and movable thereby to predetermined positions to selectively register with an aperture, a shield surrounding the light to confine said light on a desired aperture, an electrical circuit comprising a plurality of branch circuits, one of said branches including said lamp and a circuit closure adapted to open the complete circuit.

9. In a camera, in combination, a lens, a shutter, shutter actuating mechanism, an electrical circuit comprising a member movable with the shutter and reciprocable in a predetermined path and a switch the actuating member of which is disposed in the path of the movable member, said movable member having a pivoted arm constrained to engage and actuate the actuating member in one direction of its movement but free for displacement when moving in the opposite direction to ride past the actuating member.

10. In a camera, the combination with a lens, of a shutter, shutter actuating mechanism, an electrical circuit comprising a member movable with the shutter and reciprocable in a predetermined path and a switch the actuating member of which is disposed in the path of the movable member.

11. In a camera, the combination with a lens, a shutter, shutter actuating mechanism, an electrical circuit comprising a solenoid actuating said shutter mechanism, a member movable with the shutter and reciprocable in a predetermined path and a switch the actuating member of which is disposed in the path of the movable member.

12. In a camera, the combination with a lens, a shutter, shutter actuating mechanisms, an electrical circuit comprising a solenoid actuating said shutter mechanism, a member movable with the shutter and reciprocable in a predetermined path and a switch the actuating member of which is disposed in the path of the movable member, said movable member having means constrained to engage and actuate the actuating member in one direction of its movement but free for displacement when moving in the opposite direction to ride past the actuating member.

13. In a camera, an electrically actuated shutter comprising a shutter actuating plunger, a lever, extensible means connecting one arm of the lever to the plunger, a solenoid connected to the other arm of the lever and means to energize the shutter.

14. In a camera, an electrically actuated shutter comprising means to actuate said shutter for time exposure comprising reciprocable member, a manually actuated bell crank extensible means connecting the bell crank with the reciprocable member, means to actuate said shutter for instantaneous exposure comprising a second reciprocable member, a lever, an electrical circuit comprising a circuit closer and a solenoid, and extensible means connecting the second reciprocable member with one arm of the lever, the other arm of the lever being connected with the solenoid.

15. In a camera, the combination with a lens system, a shutter and shutter actuating mechanism, of a frame reciprocable in one direction behind the lens, and having means formed with guides for a second frame and a second frame reciprocable in said guides in another direction behind the lens, one of said frames comprising means to removably support a film holder.

16. In a camera, the combination with a lens system, a shutter and shutter actuating mechanism, of a frame vertically movable behind the lens, and having means formed with horizontal guides for a second frame, a second frame horizontally movable in said guides behind the lens, said second frame comprising means to removably support a film holder.

17. In a camera, the combination with a lens system, a shutter and shutter actuating mechanism, of a frame reciprocable in one direction behind the lens, a second frame reciprocable on the first frame in another direction behind the lens and comprising means to removably support a film holder, power storing means to move one frame with respect to the other and pawl and ratchet means to position predetermined areas of the film holder behind the lens.

18. In a camera, the combination with a lens system, a shutter and shutter actuating mechanism, of a frame reciprocable in one direction behind the lens, a second frame reciprocable on the first frame in another direction behind the lens and comprising means to removably support a film holder, power storing means to move one frame with respect to the other, pawl and ratchet means carried with the respective frames to position predetermined areas of the film holder behind the lens, electrical solenoid means to actuate said pawl and ratchet means, a circuit closer actuated by the shutter and a circuit comprising said electric solenoid means and said shutter actuated circuit closer.

19. In a camera, the combination with a lens system, a shutter and shutter actuating mechanism, of a frame reciprocable in one direction behind the lens, a frame reciprocable in another direction behind the lens, one of said frames comprising means to removably support a film holder, power storing means to move one frame with respect to the other, means carried with the respective frames to position predetermined areas of the film holder behind the lens, electrical means to actuate said positioning means, a circuit closer actuated by the shutter, a circuit comprising said electric means and said shutter actuated circuit closer, gravity means to position one of the frames in different vertical positions with respect to the lens, electrical circuits comprising electrical means to actuate said gravity means and circuit closers in said circuit closed by one of the frames to energize the solenoids.

20. In a camera, the combination with a lens system, a shutter and shutter actuating mechanism, of a frame reciprocable in one direction behind the lens, a frame reciprocable in another direction behind the lens, one of said frames comprising means to removably support a film holder, means comprising power storing means and a motor having a predetermined movement to store up power in the power storing means to move one frame with respect to the other, said motor being carried by one frame, pawl and ratchet means carried with the respective frames to position predetermined areas of the film holder behind the lens, electrical solenoid means to actuate said pawl and ratchet means, a circuit closer actuated by the shutter, a circuit comprising said electric solenoid means and said shutter actuated circuit closer, means to position one of the frames in different vertical positions with respect to the lens, electrical circuits comprising electrical solenoid means to actuate said positioning means and circuit closers in said circuit closed by one of the frames to energize the solenoids.

21. In a camera, the combination with a lens system, a shutter and shutter actuating mechanism, of a frame reciprocable in one direction behind the lens, and having means formed with horizontal guides for another frame, a frame reciprocable in another direction behind the lens, one of said frames comprising means to removably support a film holder, means to move one frame with respect to the other, pawl and ratchet means carried with the respective frames to position predetermined areas of the film holder behind the lens, electrical means to actuate said pawl and ratchet means, a circuit closer actuated by the shutter, a circuit comprising said electric solenoid means and said shutter actuated circuit closer, means to position one of the frames in different vertical positions with respect to the lens, electrical circuits comprising electrical solenoid means to actuate said last named positioning means, circuit closers in said circuit closed by one of the frames to energize the solenoids and electrical means to return said frames to initial position comprising circuit closing means actuated by the last moved frame during its final movement.

22. In a camera, the combination with a pair of relatively movable frames, means comprising a crank having a predetermined movement and power storing means to move one frame with respect to the other, comprising a rod connected at one end to the motor crank, a sleeve reciprocable on the rod, a lever pivoted on one frame, the ends of which are connected to the other frame and to the sleeve, respectively, expansible springs on the rod engaging opposite sides of the sleeve, respectively, and stops for the free ends of the springs.

23. In a camera, the combination with a case, a lens system, a shutter and shutter actuating mechanism, of a frame reciprocable in one direction behind the lens, a frame reciprocable in another direction behind the lens, one of said frames comprising means to removably support a film holder, means to position predetermined areas of the film holder behind the lens, said case provided with a door in register with the film holder for removal and insertion thereof only at initial position of both frames.

24. In a camera, the combination with a lens system, a shutter and shutter actuating mechanism, of a frame reciprocable in one direction behind the lens, a frame reciprocable in another direction behind the lens, one of said frames comprising means to removably support a film holder, electrical means to move one frame with respect to the other, electrical means to position predetermined areas of the film holder behind the lens, a circuit closer actuated by the shutter, a circuit comprising said electric solenoid means and said shutter actuated circuit closer, electrical means to position one of the frames in different vertical positions with respect to the lens, electrical circuits comprising said electrical means and circuit closers in said circuits closed by the frames, means to deenergize all circuits at the last position of said frames and means to energize said circuits at initial position of the frames.

25. In a camera, the combination with a lens behind which a film is movable to bring predetermined areas of the film at the focus of the lens, of a masking tunnel disposed between the lens and the film and a flap disposed between the lens and the film and movable from an unmasking position exposing the film to the entire area of the masking tunnel to a position intercepting light rays passing through the tunnel from the lens and falling on a predetermined area of the film.

FRANK G. KIRBY.
ARTHUR E. IRVING.

CERTIFICATE OF CORRECTION.

Patent No. 2,172,283. September 5, 1939.

FRANK G. KIRBY, ET AL.

It is hereby certified that error appears in the printed specification of the above numbered patent requiring correction as follows: Page 4, second column, line 3, for "as" read has; page 5, first column, line 13, for the word "from" read frame; and that the said Letters Patent should be read with this correction therein that the same may conform to the record of the case in the Patent Office.

Signed and sealed this 10th day of October, A. D. 1939.

(Seal)

Henry Van Arsdale,
Acting Commissioner of Patents.